United States Patent [19]

Gupta

[11] Patent Number: 4,826,890

[45] Date of Patent: * May 2, 1989

[54] RADIATION CURABLE COPOLYMERS OF P-ACETOXYSTYRENE AND DIALKYL MUCONATES

[75] Inventor: Balaram Gupta, North Plainfield, N.J.

[73] Assignee: Hoechst Celanese Corporation, Somerville, N.J.

[*] Notice: The portion of the term of this patent subsequent to Oct. 4, 1988 has been disclaimed.

[21] Appl. No.: 59,343

[22] Filed: Jun. 8, 1987

[51] Int. Cl.[4] ...................... C08F 2/50; C08F 267/06; C08F 22/14; C08F 18/12
[52] U.S. Cl. .................................... 522/114; 522/116; 522/121; 522/153; 525/283; 525/303; 525/305; 525/306; 525/302
[58] Field of Search ................ 435/142; 522/100, 121, 522/114, 116, 153; 526/301; 525/529, 530, 455, 66, 131, 110, 302, 307, 283, 303, 305, 306

[56] References Cited

U.S. PATENT DOCUMENTS 4,129,617 12/1978 Machi et al. .................. 522/120
4,137,137 1/1979 Machi et al. .................. 522/120

FOREIGN PATENT DOCUMENTS 0187044 7/1986 European Pat. Off. ......... 522/121
0187045 7/1986 European Pat. Off. ......... 522/121

OTHER PUBLICATIONS

Gupta, Copolymers of p-Acetoxy Styrene with any of Certain Polyunsaturated Compound (Copending Appl, Ser. #029108 filed on 3/23/87).

*Primary Examiner*—Lewis T. Jacobs
*Assistant Examiner*—Arthur H. Koeckert
*Attorney, Agent, or Firm*—Lynch, Cox, Gilman & Mahan

[57] ABSTRACT

Radiation curable compositions useful as coatings for wood, metal, glass, fabric, paper, fiber and plastics are made from copolymers of dialkyl muconates and p-acetoxystyrene blended with ethylenically unsaturated compounds.

9 Claims, No Drawings

RADIATION CURABLE COPOLYMERS OF P-ACETOXYSTYRENE AND DIALKYL MUCONATES

BACKGROUND OF INVENTION

The field of art to which this invention pertains is radiation curable compositions.

Due to environmental concerns and the high cost of solvents, commercial interest in radiation curable compositions is constantly increasing. Legislation which restricts the amount of solvent and other pollutants that can be vented to the atmosphere is one reason for this increased interest. Other reasons are the concerns expressed by unions and individuals over the possible toxic effects of prolonged exposure to volatile organic materials and also the high cost of petroleum derived solvents. Generally, radiation curable systems are essentially 100 percent reactive systems, i.e., substantially all of the components react to produce the final product. Such systems can be cured by exposure to high energy ionizing radiation or to actinic radiation in the presence of photoinitiators.

Various types of ethylenically unsaturated compounds have been used in making radiation curable compositions. Examples of such compounds include acrylated epoxies, such as those described in U.S. Pat. Nos. 3,676,398, 3,770,602, 4,072,592 and 4,511,732. Acrylated urethanes, such as those described in U.S. Pat. No. 3,700,643 and U.S. Pat. No. 4,511,732, have also been used in radiation curable compositions. Norbornene polymers, such as those described in U.S. Pat. No. 3,554,886, are examples of other types of radiation curable compositions. Constant efforts are being made to find other compositions which can be used in radiation curing.

SUMMARY OF INVENTION

This invention pertains to radiation curable compositions based on copolymers of dialkyl muconates and para-acetoxystyrene.

The radiation curable compositions of this invention are made from a blend of: (A) about 30 to about 80 weight percent of a copolymer of dialkyl muconate and p-acetoxystyrene; (B) about 20 to about 70 weight percent of a polyethylenically unsaturated radiation polymerizable compound; and, optionally, (C) about 0 to about 40 weight percent of a monoethylenically unsaturated radiation polymerizable monomer, wherein said weight percents are based on the total weight of (A), (B) and (C).

The compositions of this invention are utilized as coating compositions and can be cured by high energy electrons or by ultraviolet light if a photoinitiator is added.

DESCRIPTION OF INVENTION

The copolymers of this invention are described in copending, commonly assigned patent application, Ser. No. 29108, filed Mar. 23, 1987, now U.S. Pat. No. 4,775,730.

The dialkyl muconates which are used in preparing the copolymers utilized in this invention are diester derivatives of muconic acid. Muconic acid is a diolefinically unsaturated adipic acid derivative and can be made by the microbiological oxidation of various hydrocarbon substrates, as described in U.S. Pat. Nos. 4,480,034 and 4,535,059. The dialkyl muconates used in this invention contain 1 to 4 carbon atoms in each alkyl group and are made by the direct esterification of muconic acid with methanol, ethanol, propanol, isopropanol or the butanols. The preferred dialkyl muconates useful in this invention are dimethyl muconate and diethyl muconate.

The p-acetoxystyrene component of the copolymers used in this invention can be made by the process described in Corson et al., *Journal of Organic Chemistry* 23, 544–549 (1958). As described in this article, phenol is acetylated to p-hydroxyacetophenone which is then acetylated to p-acetoxyacetophenone. This compound is then hydrogenated to p-acetoxyphenylmethylcarbanol, which is then dehydrated to p-acetoxystyrene.

The copolymers used in this invention are prepared by the free radical polymerization of dialkyl muconate and p-acetoxystyrene, in solution, emulsion, or suspension using well known polymerization techniques. The copolymers will contain about 10 to about 90 weight percent dialkyl muconate and about 10 to about 90 weight percent of the p-acetoxystyrene monomer. The preferred copolymers are those made from dimethyl or diethyl muconate and p-acetoxystyrene using about 30 to about 70 weight percent dialkyl muconate and about 30 to about 70 weight percent p-acetoxystyrene.

The polyethylenically unsaturated radiation polymerizable compounds which are blended with the copolymers described hereinabove are compounds which contain two or more ethylenically unsaturated groups and, preferably, two to about six ethylenic groups. The ethylenically unsaturated groups are acrylate and methacrylate groups, vinyl groups and allyl groups. Compounds which contain the acrylate or methacrylate groups are acrylic or methacrylic acid esters of polyols wherein the polyols have two or more hydroxyl groups per molecule. Examples of such compounds are the diacrylic or dimethacrylic acid esters of ethylene glycol, propylene glycol, butanediol, butenediol, hexanediol, polyoxyethylene glycols, polyoxypropylene glycols, polyoxybutylene glycols, di- and triacrylic or methacrylic acid esters of glycerine and hexanetriol, trimethylolpropane, trimethylolethane, di, tri and tetra acrylic acid or methacrylic acid esters of pentaerythritol, the di, tri, tetra, penta and hexa acrylic or methacrylic acid esters of dipentaerythritol and the like. Other polyacrylates or methacrylates are the acrylated and methacrylated epoxy compounds such as the acrylated or methacrylated glycidyl ethers of dihydric phenols, acrylated and methacrylated epoxidized vegetable oils, acrylated and methacrylated urethanes and acrylated and methacrylated polyesters.

Examples of polyvinyl and polyallyl compounds are divinylbenzene, divinyltoluene, diallylbenzene, diallyltoluene, diallyl terephthalate, diallylmaleate, diallylfumarate and the like.

Monoethylenically unsaturated radiation polymerizable monomers which can be used in this invention are the well known monomeric compounds which contain one ethylenically unsaturated group per molecule. Examples of such monomers are alkyl acrylates and methacrylates wherein the alkyl group contains from 1 to 12 carbon atoms, mono and polyalkoxyalkylacrylates and methacrylates wherein the alkoxy groups and alkyl groups contain from 1 to 4 carbon atoms and wherein the molecules contain from 1 up to 20 alkoxy groups, hydroxyalkyl acrylates and methacrylates wherein the alkyl group contains from 1 to 6 carbon atoms, vinyl aromatic compounds, vinyl halides, vinyl pyrrolidone, vinyl pyridine, vinyl carbazole and the like.

The radiation curable compositions of this invention can be cured by any of the normal actinic radiation curing methods. The radiation can be ionizing radiation (either particulate or nonparticulate) or non-ionizing agents. As a suitable source of particulate radiation, one can use any source which emits electrons or charged nuclei. Particulate radiation can be generated by electron accelerators, such as the Vander Graff accelerator, resinous transformers, linear accelerators, insulating core transformers, radioactive elements, such as cobalt 60, strontium 90, and the like. As a suitable source of nonparticulate non-ionizing radiation, any source which admits radiation in the range of from $10^{-3}$ angstroms to 2000 angstroms can be used. Suitable sources included vacuum ultra violet lamps, such as xenon or krypton arcs. As a suitable source of non-ionizing radiation, any source which admits radiation from 2000 angstroms to 4000 angstroms can be used. Suitable sources include mercury arcs, carbon arcs, tungsten filament lamps, sun lamps and lasers. All of these devices and sources are well known in the art and those skilled in radiation technology are fully aware of the manner in which radiation is generated and the precautions to be taken in its use.

When the radiation curable coating compositions are to be cured by exposure to non-ionizing radiation, e.g., ultraviolet radiation, photoinitiators may be added to the compositions. Suitable photoinitiators which are well known in the art include 2,2-diethoxy-acetophenone, 2, 3 or 4-bromoacetophenone, benzaldehyde, benzoin, benzophenone, 9,10-dibromoanthracene, 4,4'-dichlorobenzophenone, 2,3-pentanedione, hydroxycyclohexyl phenyl ketone and xanthone. Such photoinitiators are generally added in amounts of from about 0.1 weight percent up to 10 weight percent based on the weight of the total curable composition and, preferably, 1 to 5 weight percent.

Photoactivators can also be used in combination with the photoinitiators. Examples of photoactivators are methylamine, tributylamine, 2-aminoethylethanolamine, cyclohexylamine, diphenylamine and tribenzylamine.

The radiation curable compositions of this invention are preferably used as coating compositions. The coatings can be applied by conventional means, including spraying, curtain coating, dip padding, roll coating and brushing procedures. The coatings can be applied to any acceptable substrate such as wood, metal, glass, fabric, paper, fiber, plastics, etc.

The compositions of this invention are made by blending the copolymers of dialkyl muconate and p-acetoxystyrene with the polyethylenically unsaturated compounds. In order to adjust the viscosity for proper application, monoethylenically unsaturated monomers can be added. Additional additives which can be used in the compositions include wetting agents, fillers, defoamers, dyes and pigments, the uses of which are well known in the art.

The following examples illustrate the invention in more detail. Parts and percentages unless otherwise designated are parts and percentages by weight.

EXAMPLE A

To a suitable reactor are added 105 parts of p-acetoxystyrene (ASM), 80 parts of toluene and 1.26 parts of 2,2'-azobis (2,4-dimethyl valeronitrile) followed by degassing by three freeze-pump-thaw cycles. Dimethyl muconate (MMu), 18 parts, is added at once with good stirring. The mixture is heated to 70°–80° C. under argon with stirring for 20 hours. The resulting syrupy mass is dissolved in 500 parts by volume of acetone and is suction filtered to remove insoluble impurities. The clear polymer solution is then coagulated with 14,000 parts by volume of methanol acidified with 10 parts by volume of dilute HCl to obtain a white granular polymer. After filtration and drying, 111.6 parts of white powder are recovered. Based on elemental analysis and proton NMR analysis, the composition of the polymer is found to be ASM:MMu-80:20 molar ratio. The Tg of the polymer is 106.5° C. The thermal decomposition onset of the polymer is 260° C. in nitrogen atmosphere. The molecular weights are: $M_w = 57,650$ and $M_n = 33,300$.

EXAMPLE B

Using the same procedure described in Example A, the following reactants are polymerized: 35 parts p-acetoxystyrene (ASM), 3.0 parts diethyl muconate (EMu), 0.42 part 2,2'-azobis (2,4-dimethyl valeronitrile) and 26 parts toluene. The resulting polymer, 28 parts, has a molecular composition of ASM:EMu of 90:10. The molecular weights are $M_w$ of 40,900 and $M_n$ of 25,500.

EXAMPLE 1

In a suitable reactor are mixed 20 parts of a copolymer of p-acetoxystyrene and dimethyl muconate containing 18 parts p-acetoxystyrene and 2 parts dimethyl muconate, 23 parts of 1,6-hexanediol diacrylate, 7.5 parts oof tetraethylene glycol diacrylate and 2.5 parts of Darocur 1173, a photoinitiator obtained from Merck & Company. Films are drawn down on polyester sheet and glass using a two mil wire wound rod. The films are cured at a line speed of 20–50 ft. per minute with a RPC Ultraviolet Curing Unit, Model QC-1202 Radiation Polymer Company, Plainfield, Illinois with one 300 watt per linear inch mercury vapor lamp without an infrared filter. The films exhibit excellent cure.

EXAMPLE 2

A blend is made from 20 parts of a copolymer of 17 parts of p-acetoxystyrene and 3 parts of diethyl muconate, 24 parts of 1,6-hexanediol diacrylate, 17 parts of tetraethylene glycol diacrylate and 5 parts of Darocur 1173. Using the same procedure described in Example 1, excellently cured films are obtained.

EXAMPLE 3

Blends are made from 40 parts of a copolymer of 30 parts of p-acetoxystyrene and 70 parts of dimethyl muconate, 35 parts of trimethylolpropane triacrylate, 5 parts of ethoxyethoxyacrylate, 20 parts of N-vinyl pyrrolidone and 2 parts of hydroxycyclohexylphenyl ketone. Coatings are drawn down on filled particle board at 0.5 mil thickness and are cured using the procedure described in Example 1. Excellently cured coatings are obtained.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A radiation curable composition comprising a blend of (A) about 30 to about 80 weight percent of a copolymer of dialkyl muconate and p-acetoxystyrene; (B) about 20 to about 70 weight percent of a polyethylenically unsaturated radiation polymerizable compoud different from (A); and (C) about 0 to about 40 weight percent of a monoethylenically unsaturated radiation polymerizable monomer, wherein the weight percents are based on the total weight of (A), (B) and (C), wherein the copolymer contains about 10 to about 90 weight percent dialkyl muconate and about 90 to about 10 weight percent p-acetoxystyrene and wherein the alkyl group contains from 1 to 4 carbon atoms.

2. The radiation curable composition of claim 1 wherein the copolymer contains about 30 to about 70 weight percent p-acetoxystyrene.

3. The radiation curable composition of claim 1 wherein the dialkyl muconate is dimethyl muconate.

4. The radiation curable composition of claim 1 wherein the dialkyl muconate is diethyl muconate.

5. The radiation curable composition of claim 1 wherein the polyethylenically unsaturated radiation polymerizable compound contains at least two ethylenically unsaturated groups per molecule.

6. The radiation curable composition of claim 5 wherein the polyethylenically unsaturated radiation polymerizable compound contains 2 to 6 ethylenically unsaturated groups.

7. The radiation curable composition of claim 1 which contains a photoinitiator.

8. The radiation curable composition of claim 7 wherein the photoinitiator is present in the amount of about 0.1 weight percent up to about 10 weight percent based on the total weight of the composition.

9. The radiation curable composition of claim 8 wherein the photoinitiator is present in the amount of about 1 to about 5 weight percent.

* * * * *

UNITED STATES PATENT AND TRADEMARK OFFICE
CERTIFICATE OF CORRECTION

PATENT NO. : 4,826,890

DATED : May 2, 1989

INVENTOR(S) : Balaram Gupta

It is certified that error appears in the above-identified patent and that said Letters Patent is hereby corrected as shown below:

On the title Page:
  Column 1, in the Notice: delete "1988" and insert --2005--.

Signed and Sealed this

Fifth Day of December, 1989

*Attest:*

JEFFREY M. SAMUELS

*Attesting Officer*     *Acting Commissioner of Patents and Trademarks*